United States Patent
Jarriel et al.

(12) 
(10) Patent No.: US 6,553,403 B1
(45) Date of Patent: Apr. 22, 2003

(54) SYSTEM, METHOD AND COMPUTER PROGRAM PRODUCT FOR MONITORING IN A DISTRIBUTED COMPUTING ENVIRONMENT

(75) Inventors: Stuart Jarriel, Austin, TX (US); Michael McNally, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,960

(22) Filed: Jun. 3, 1998

(51) Int. Cl.[7] .............................................. G06F 15/16
(52) U.S. Cl. ...................................... 709/202; 709/223
(58) Field of Search ............................... 709/223, 224, 709/244, 239, 240, 313, 317, 318, 320, 202; 370/252, 253, 254; 340/825.06, 825.16; 714/47, 25

(56) References Cited

U.S. PATENT DOCUMENTS

| | | | |
|---|---|---|---|
| 4,792,921 A | | 12/1988 | Corwin |
| 5,157,667 A | * | 10/1992 | Carusone, Jr. et al. ......... 714/45 |
| 5,301,270 A | * | 4/1994 | Steinberg et al. ............ 345/866 |
| 5,303,243 A | * | 4/1994 | Anezaki ....................... 714/13 |
| 5,321,813 A | * | 6/1994 | McMillen et al. ........... 714/798 |
| 5,321,837 A | | 6/1994 | Daniel et al. |
| 5,337,360 A | * | 8/1994 | Fischer ....................... 713/176 |
| 5,355,313 A | * | 10/1994 | Moll et al. ...................... 702/2 |
| 5,355,484 A | * | 10/1994 | Record et al. ................. 717/4 |
| 5,367,635 A | * | 11/1994 | Baur et al. ................... 709/221 |
| 5,410,651 A | * | 4/1995 | Sekizawa et al. ........... 709/224 |
| 5,430,875 A | * | 7/1995 | Ma ............................. 709/318 |
| 5,467,462 A | | 11/1995 | Fujii |
| 5,499,374 A | | 3/1996 | Di Giulio et al. |
| 5,528,516 A | * | 6/1996 | Yemini et al. ............... 702/181 |
| 5,572,528 A | * | 11/1996 | Shuen ......................... 370/402 |
| 5,596,712 A | * | 1/1997 | Tsuyama et al. .............. 714/26 |
| 5,603,029 A | * | 2/1997 | Aman et al. ................. 709/105 |
| 5,623,628 A | * | 4/1997 | Brayton et al. .............. 711/141 |
| 5,655,081 A | * | 8/1997 | Bonnell et al. ............. 709/202 |
| 5,692,119 A | * | 11/1997 | Koguchi et al. ................ 714/4 |
| 5,706,422 A | * | 1/1998 | Maruyama et al. ............ 714/4 |

(List continued on next page.)

OTHER PUBLICATIONS

Engler, D.R. et al. "Exokernel: an operating system architecture for application–level resource management", ACM Sym. on Operating Systems Principles, pp. 251–266, Dec. 1995.*

Tennenhouse, D.L. "Towards an Active Network Architecture", www.tns.lcs.mit.edu, pp. 1–14, Jan. 1996.*

Tennenhouse, D.L. "A survey of active network research", IEEE Communications Mag., pp. 80–86, Jan. 1997.*

*Primary Examiner*—Zarni Maung
*Assistant Examiner*—Jason D. Cardone
(74) *Attorney, Agent, or Firm*—Duke W. Yee; Jeffrey S. LaBaw; Stephen R. Tkacs

(57) ABSTRACT

A method of monitoring in a distributed computer network having a management server servicing a set of managed computers. The method begins by deploying a management infrastructure across a given subset of the managed computers, the management infrastructure comprising a runtime environment installed at a given managed computer. At the given managed computer, the routine executes a monitoring agent in the runtime environment to determine whether a given threshold has been exceeded. Then, a given action is taken if the given threshold has been exceeded. The monitoring agent is executed upon receipt of an external event or as a result of an internal timer. Execution of the monitoring agent involves taking a measurement, comparing the measurement against the given threshold, and then taking some corrective action if possible.

26 Claims, 6 Drawing Sheets

U.S. PATENT DOCUMENTS

| | | | | |
|---|---|---|---|---|
| 5,761,428 A | * | 6/1998 | Sidey | 709/223 |
| 5,764,991 A | * | 6/1998 | Carcerano | 717/5 |
| 5,768,506 A | * | 6/1998 | Randell | 709/202 |
| 5,802,291 A | * | 9/1998 | Balick et al. | 709/202 |
| 5,805,884 A | * | 9/1998 | Sitbon et al. | 709/320 |
| 5,809,238 A | * | 9/1998 | Greenblatt et al. | 709/202 |
| 5,815,652 A | * | 9/1998 | Ote et al. | 714/31 |
| 5,818,818 A | * | 10/1998 | Soumiya et al. | 370/252 |
| 5,822,583 A | * | 10/1998 | Tabuchi | 709/100 |
| 5,826,020 A | * | 10/1998 | Randell | 709/202 |
| 5,828,882 A | * | 10/1998 | Hinckley | 709/318 |
| 5,838,918 A | * | 11/1998 | Prager et al. | 709/221 |
| 5,838,969 A | * | 11/1998 | Jacklin et al. | 709/318 |
| 5,872,931 A | * | 2/1999 | Chivaluri | 709/223 |
| 5,887,171 A | * | 3/1999 | Tada et al. | 709/317 |
| 5,901,286 A | * | 5/1999 | Danknick et al. | 709/203 |
| 5,913,037 A | * | 6/1999 | Spofford et al. | 709/226 |
| 5,920,692 A | * | 7/1999 | Nguyen et al. | 709/204 |
| 5,944,782 A | * | 8/1999 | Noble et al. | 709/202 |
| 5,944,783 A | * | 8/1999 | Nieten | 709/202 |
| 5,949,757 A | * | 9/1999 | Katoh et al. | 370/232 |
| 5,958,009 A | * | 9/1999 | Friedrich et al. | 709/224 |
| 5,958,016 A | * | 9/1999 | Chang et al. | 709/229 |
| 5,987,135 A | * | 11/1999 | Johnson et al. | 709/224 |
| 6,006,230 A | * | 12/1999 | Ludwig et al. | 707/10 |
| 6,006,251 A | * | 12/1999 | Toyouchi et al. | 709/203 |
| 6,006,264 A | * | 12/1999 | Colby et al. | 709/226 |
| 6,009,456 A | * | 12/1999 | Frew et al. | 709/202 |
| 6,012,152 A | * | 1/2000 | Douik et al. | 714/26 |
| 6,029,175 A | * | 2/2000 | Chow et al. | 707/104.1 |
| 6,049,819 A | * | 4/2000 | Buckle et al. | 709/202 |
| 6,055,562 A | * | 4/2000 | Devarakonda et al. | 709/202 |
| 6,061,721 A | * | 5/2000 | Ismael et al. | 709/223 |
| 6,067,288 A | * | 5/2000 | Miller et al. | 370/242 |
| 6,073,162 A | * | 6/2000 | Joannsen et al. | 709/202 |
| 6,075,863 A | * | 6/2000 | Krishnan et al. | 713/191 |
| 6,088,727 A | * | 7/2000 | Hosokawa et al. | 709/223 |
| 6,112,225 A | * | 8/2000 | Kraft et al. | 709/202 |
| 6,189,047 B1 | * | 2/2001 | Ball | 709/318 |
| 6,212,676 B1 | * | 4/2001 | Seaman et al. | 717/4 |
| 6,226,665 B1 | * | 5/2001 | Deo et al. | 709/106 |
| 6,226,693 B1 | * | 5/2001 | Chow et al. | 709/318 |
| 6,266,709 B1 | * | 7/2001 | Gish | 709/315 |
| 6,275,957 B1 | * | 8/2001 | Novik et al. | 714/39 |
| 6,330,597 B2 | * | 12/2001 | Collin et al. | 709/220 |
| 6,336,139 B1 | * | 1/2002 | Feridun et al. | 709/224 |
| 6,363,421 B2 | * | 3/2002 | Barker et al. | 709/223 |

* cited by examiner

SYSTEM, METHOD AND COMPUTER PROGRAM PRODUCT FOR MONITORING IN A DISTRIBUTED COMPUTING ENVIRONMENT

BACKGROUND OF THE INVENTION

1. Technical Field

The present invention is directed to managing a large distributed computer enterprise environment and, more particularly, to correlating system and network events in a system having distributed monitors that use events to convey status changes in monitored objects.

2. Description of the Related Art

Companies now desire to place all of their computing resources on the company network. To this end, it is known to connect computers in a large, geographically-dispersed network environment and to manage such an environment in a distributed manner. One such management framework comprises a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. As the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day.

Thus, as the size of the distributed computing environment increases, it becomes more difficult to centrally monitor system and network events that convey status changes in various monitored objects (e.g., nodes, systems, computers, subsystems, devices and the like). In the prior art, it is known to distribute event monitor devices across machines that are being centrally managed. Such event monitors, however, typically use a full-fledged inference engine to match event data to given conditions sought to be monitored. An "inference engine" is a software engine within an expert system that draws conclusions from rules and situational facts. Implementation of the event monitor in this fashion requires significant local system resources (e.g., a large database), which is undesirable. Indeed, as noted above, it is a design goal to use only a lightweight management framework within the endpoint machines being managed.

Prior art techniques have several other significant disadvantages. One problem is lack of scalability. As the number of connected nodes increases, it has not been possible for an administrator to easily add monitoring capabilities to an appropriate subset of the endpoints with minimal effort. Even when the monitoring application can be configured, it may not operate appropriately under peak conditions. Another significant problem is that local monitors do not have sufficient built-in response capability. In large distributed systems, it is often insufficient to note merely that a monitored value of a particular resource is out of tolerance. Whenever possible, a local attempt to correct the situation must be made. Known systems do not have adequate local response capability. Moreover, some errors have no local remedy and, in those cases, the response must have a corresponding remote action that can be triggered by the client error.

The prior art has not adequately addressed these and other problems. Thus, there remains a need to provide more efficient monitoring techniques within a distributed computer environment wherein distributed monitors use events to convey status changes in monitored objects within the environment.

BRIEF SUMMARY OF THE INVENTION

It is thus a primary object of this invention to provide distributed monitoring of resources within a distributed computing environment.

It is another primary object of this invention to implement a distributed monitor runtime environment at given nodes in a large distributed computer network to facilitate the task of resource monitoring.

It is still another important object of the present invention to provide a robust event-driven control mechanism for correcting out-of-tolerance conditions identified with respect to resources being monitored in a local network system.

It is yet another object of the present invention to facilitate addition of monitoring capabilities to new endpoint machines in a large computer network as the network is scaled.

A more general object of this invention is to provide resource monitoring across a distributed computer environment.

These and other objects of the invention are provided in a method of monitoring implemented within a distributed environment having a management server and a set of managed machines. A given subset of the managed machines include a distributed management infrastructure. In particular, each managed machine in the given subset includes a runtime environment, which is a platform-level service that can load and execute software agents. One or more software agents are deployable within the distributed environment to facilitate management and other control tasks. The runtime environment at a particular node includes a runtime engine, and a distributed monitor (DM) for carrying out monitoring tasks.

A representative monitoring operation involves making a measurement, comparing the measured value against threshold(s), and performing a response for out-of-tolerance conditions. According to the present invention, a monitoring agent may be triggered to run via a timer or upon satisfaction of a given correlation condition. An event correlator is used to determine whether the given correlation condition has been met.

In accordance with one aspect of the invention, there is described a method of monitoring in a distributed computer network having a management server servicing a set of managed computers. The method begins by deploying a management infrastructure across a given subset of the managed computers, the management infrastructure comprising a runtime environment installed at a given managed computer. At the given managed computer, the routine executes a monitoring agent in the runtime environment to determine whether a given threshold has been exceeded. Then, a given action is taken if the given threshold has been exceeded. The monitoring agent is executed upon receipt of an external event or as a result of an internal timer. Execution of the monitoring agent involves taking a measurement, comparing the measurement against the given threshold, and then taking some corrective action if possible.

Another aspect of the present invention is a method of monitoring in a distributed computer network having a set of managed computers, wherein a management infrastructure is deployed across a given subset of the managed computers and comprises a runtime environment installed at a given managed computer. The method begins by establishing an event class registration list at a given managed computer. Upon receipt of an event having an event class associated therewith, the routine then examines the registration list to determine whether a given monitoring task has expressed interest in the event class. If so, the event is processed through a correlator. Then, a given action is taken (e.g., executing the given monitoring task) if a condition expressed in a correlation rule associated with the monitoring task has been met. The given monitoring task may include a response function to attempt to correct the condition that triggered the task.

Another aspect of this invention is a monitor system for use in a managed machine connected in a distributed computer network. The monitor system comprises a runtime engine, and an event correlator/router executable in the runtime engine and responsive to an event stream to determine whether a set of one or more events satisfying a given correlation condition have been received. At least one monitor task is also executable in the runtime engine upon satisfaction of the given correlation condition to effect monitoring of a managed local resource. The monitor task may also implement a correction task using the runtime engine or other local resources.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
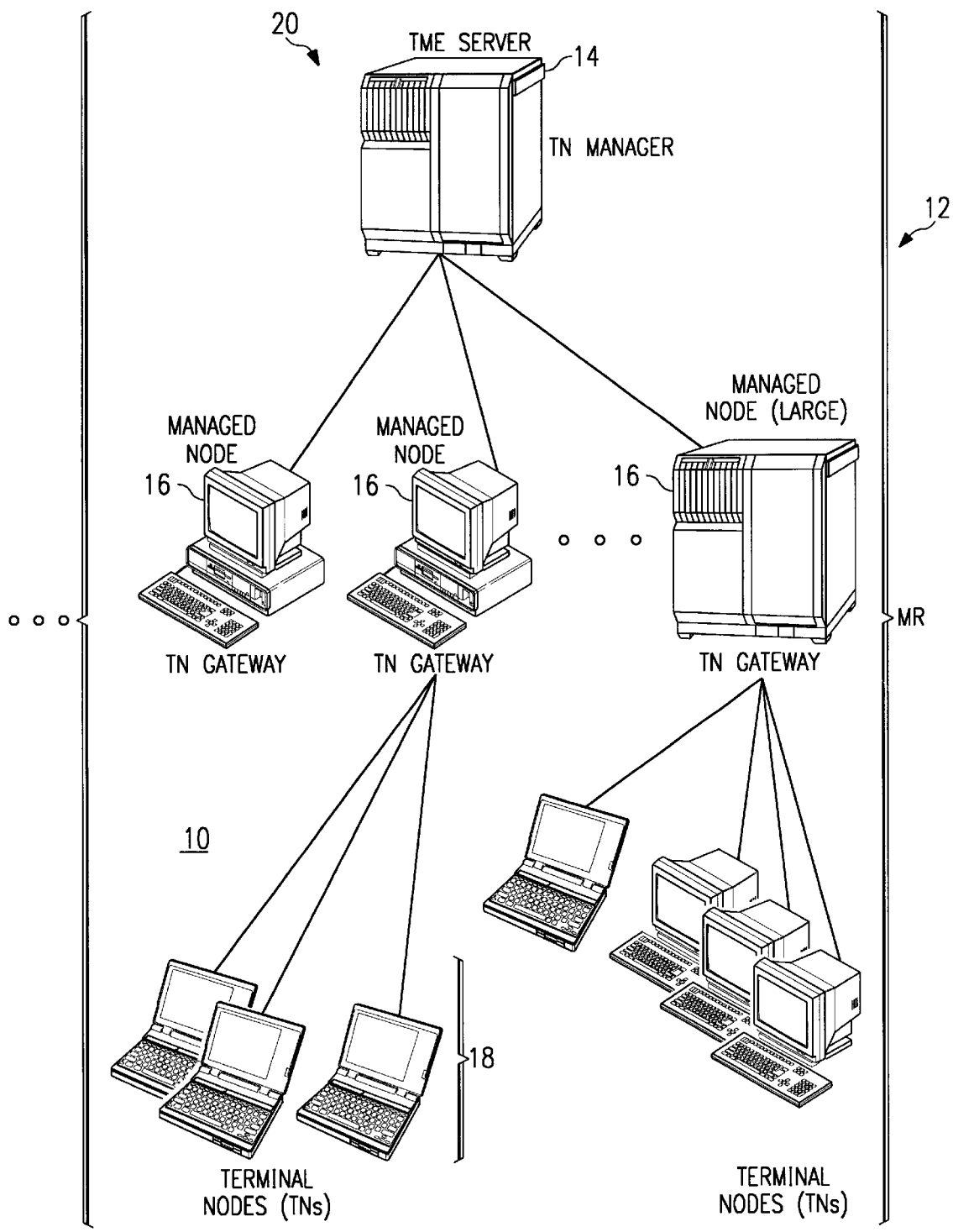
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn supports a plurality of endpoints 18. The server 14 coordinates all activity within the MR using a terminal node manager 20.

Figure 2:
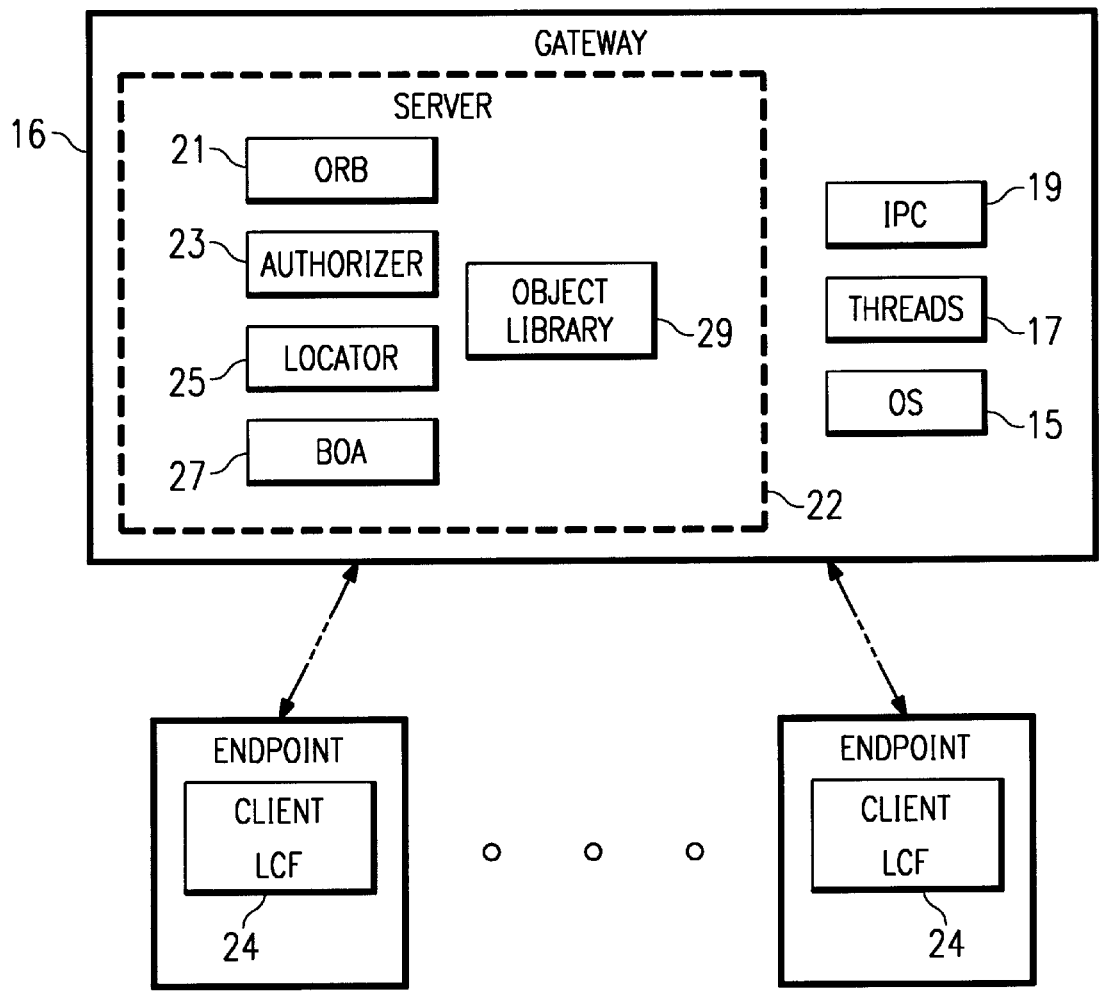
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
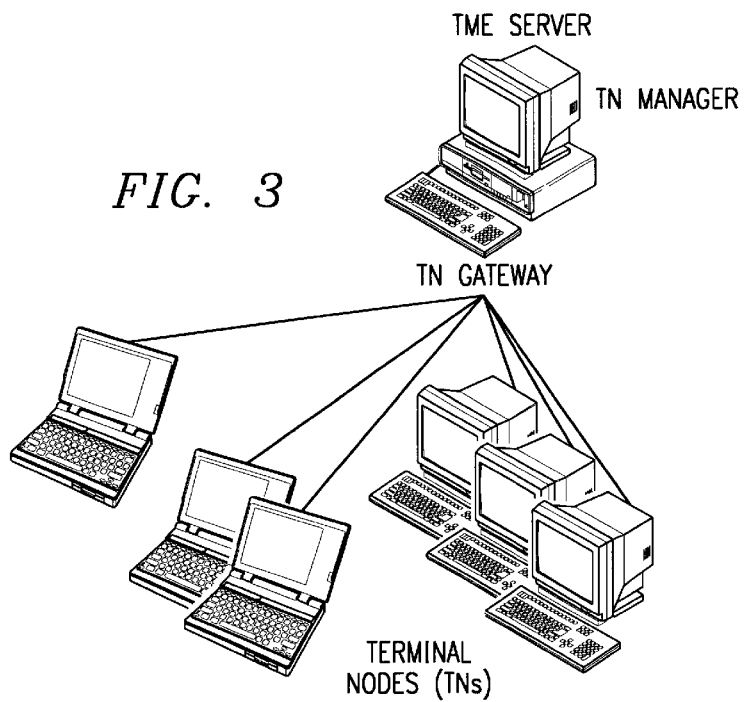
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2A:
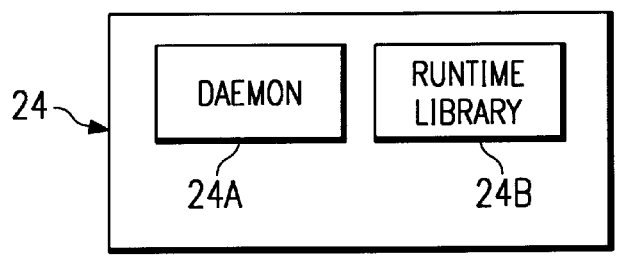
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX ((Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

Preferably, the client-class framework running on each endpoint is a low-maintenance, low-cost framework that is ready to do management tasks but consumes few machine resources (because it is normally in an idle state). Each endpoint may be "dataless" in the sense that system management data is not stored therein before or after a particular system management task is implemented or carried out.

This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint may pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Figure 4:
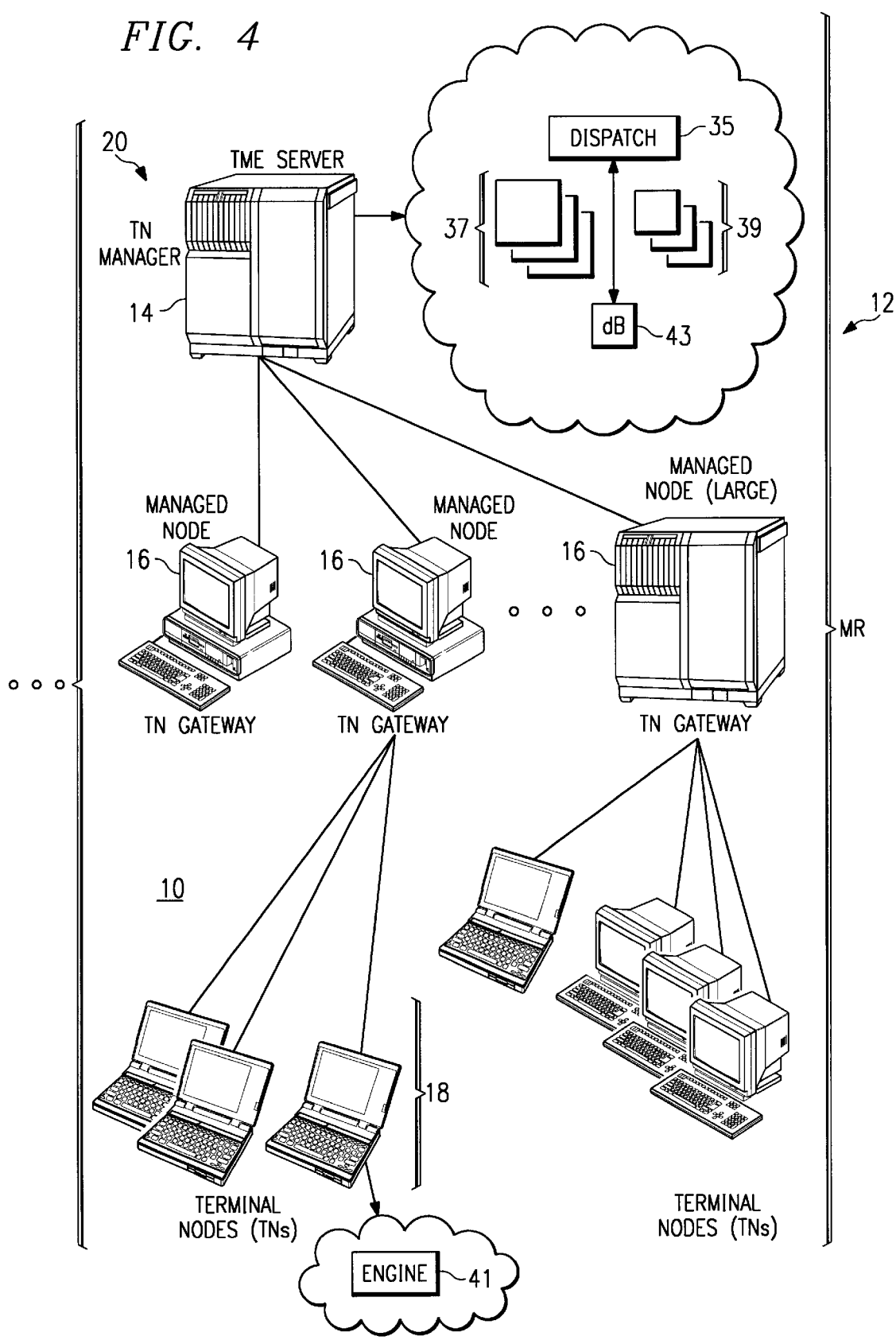
FIG. 4 is a distributed computer network environment having a management infrastructure for use in carrying out the preferred method of the present invention.

As distributed systems such as described above grow in size and complexity, management becomes more difficult. To facilitate system management, certain of the managed machines may include a uniform "engine" that executes one or more tasks (e.g., software "agents") that have been distributed by a central mechanism. This architecture is illustrated in FIG. 4.

In this embodiment, a set of "software agents" 37 are available at a central location (e.g., manager 14) or at a plurality of locations (e.g., the gateways 16) in the network where administrative, configuration or other management tasks are specified, configured and/or deployed. The software agents are "mobile" in the sense that the agents are dispatched from a dispatch mechanism 35 and then migrate throughout the network environment. Generally, as will be seen, the mobile software agents traverse the network to perform or to facilitate various network and system management tasks. Alternatively, dispatch mechanism 35 may include a set of configurable software tasks 39 from which one or more agents are constructed. Manager 14 preferably also includes a database 43 including information identifying a list of all machines in the distributed computing environment that are designed to be managed. The dispatch mechanism itself may be distributed across multiple nodes.

At least some of the gateway nodes 16 and at least some of the terminal nodes 18 (or some defined subset thereof) include a runtime environment 41 that has been downloaded to the particular node via a distribution service. The runtime environment 41 includes a runtime engine (as well as other components) for a software agent as will be described. Software agents are deployable within the network to perform or to facilitate a particular administration, configuration or other management task specified by an administrator or other system entity. Preferably, the software agent is a piece of code executed by the runtime engine located at a receiving node. Alternatively, the software agent runs as a standalone application using local resources.

In a representative embodiment, both the runtime engine and the software agent(s) are written in Java. As is known in the art, Java is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser.

In one particular embodiment, a software agent is a Java applet (e.g., comprised of a set of Java "class" files) and the runtime environment includes a Java Virtual Machine (JVM) associated with a Web browser. In this illustrative example, various nodes of the network are part of the Internet, an intranet, or some other computer network or portion thereof.

When the administrator configures a task for deployment, the dispatch mechanism compiles the appropriate Java class files (preferably based on the task or some characteristic thereof) and dispatches the applet (as the software agent) in the network. An applet is then executed on the JVM located at a receiving node.

Figure 5:
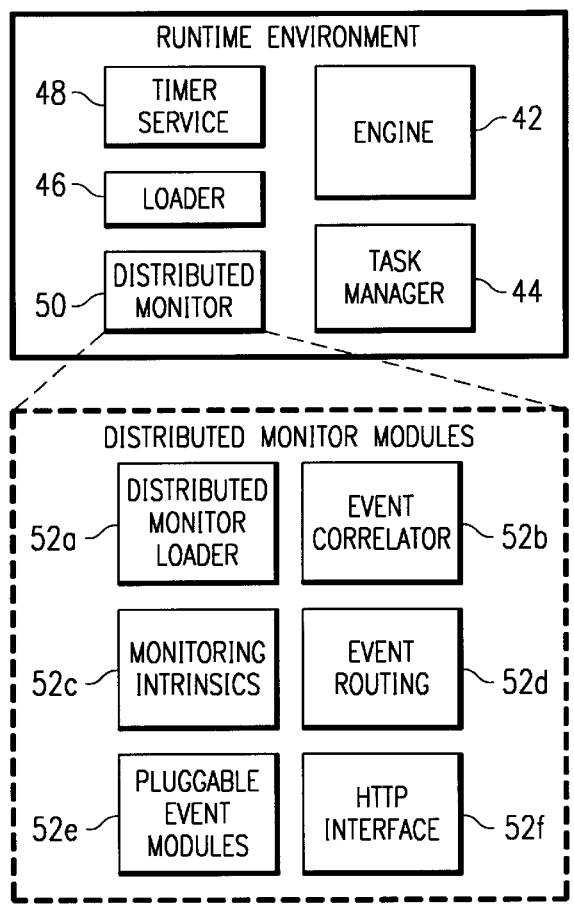
FIG. 5 is a block diagram illustrating a preferred runtime environment located at a managed machine within the distributed computer network.

The runtime environments located across a set of given managed machines collectively comprise a management infrastructure deployed throughout the computer network. FIG. 5 is a block diagram of a preferred runtime environment. The runtime environment is a platform-level service that can load and execute software agents. The environment 41 includes the runtime engine 42, a task manager 44, a loader 46, a timer service 48, and a distributed monitor 50. The distributed monitor (DM) 50 comprises a set of tasks or modules 52a–f run by the runtime engine 42 and that allow the environment to perform monitoring activities. The particular monitoring activities performed, of course, depend on the resources being managed, but typically such resources include storage devices and subsystems, printers, given programs and/or tasks, and any other managed resource. Generally, any such system, subsystem, device, resource, program or the like may be deemed a "managed object." If desired the runtime environment components may be used for activities other than monitoring (e.g., remote task execution).

A representative monitoring operation involves making a measurement, comparing the measured value against threshold(s), and performing a response for out-of-tolerance conditions. A monitoring agent is internally organized as a program, with measurement, threshold comparison and response elements. To the extent possible, a monitoring agent must attempt to correct the detected condition when a threshold has been exceeded.

The DM loader 52a controls the other DM modules. The event correlator 52b implements event correlation. There are a number of operations that many monitors will have in common. A set of these are implemented as monitoring intrinsics (tasks) 52c, and these tasks are available to all monitor agents. They are preferably implemented in Java, thus if the distributed monitor invokes an intrinsic task the DM will already have the Java implementation for it. Moreover, monitor agents may take local action, remote action, or send an event in response to an out-of-tolerance condition, with local action strongly preferred. A monitoring agent is preferably defined with the response as an integral part. Because an agent may contain logic, it can make the desired measurements and then respond to the measured value appropriately (e.g., send event, send e-mail, run task, etc.). Available responses are not a fixed set, but rather another task in the agent. A set of response tasks are thus also provided as part of the monitoring intrinsics.

Routing is provided by the event router 52d as will be described in more detail below. Pluggable event modules (PEMs) 52e are used to integrate new event sources/destinations with the other modules. A PEM is a task that may represent an event source, an event destination or both, and it is started when the distributed monitor 50 starts. The distributed monitor 50 may be optionally configured to perform basic HTTP server duties (e.g., servicing HTTP GET requests, where the URL of the GET may be a DM topology request, or a request for a status of a particular DM). The HTTP interface 52f is responsible for turning the requested data into HTML and returning it to the calling browser.

The runtime environment may be configured to load and run software agents at a startup time. When the environment has been configured to act as a distributed monitor, some or all of the modules 52 are loaded (by the DM loader 52a) depending on DM configuration data. Each module 52 then preferably configures itself at startup time and then begins its appointed task. After the environment has completed initialization, it periodically scans its timer list for scheduled work and waits for commands.

The local runtime environment preferably supports at least two (2) types of software agents: service and monitoring. A service agent is initialized at startup by the DM Loader 52a, and it must implement the Java Service interface. A service agent is responsible for extending the base behavior of the runtime environment. A monitoring agent is responsible for making a measurement, comparing the measured value against threshold(s), and performing a response for out-of-tolerance conditions.

Agents may be parametric, with the parameters binding to values when the agent is stored in the profile, when the agent is run on the endpoint, or both. Agent parameters can be used to specify threshold values (>80%), response task arguments (send e-mail to $ARG3), or other control values (log last 25 values for graphing).

As noted above, service agents are started by the DM loader 52a at startup time. Each DM can be individually configured to use one or more service agents. Service agents are identified in the dispatch mechanism repository and are propagated to the DMs across the managed environment when the agent profile is pushed even though the service agent does not appear in the profile. The repository tracks which service agents are configured on which DMs, and it will distribute the configuration information to the DM loader when the agent profile is pushed.

Monitoring agents are defined in the repository and configured to run on different DMs via agent profiles. As discussed above, monitoring agents are organized as a program, with measurement, threshold comparison and response elements. The runtime environment preferably provides a list of currently-configured monitoring agents, including the following information:

Name of agent

Name of agent Collection

Agent Index (unique ID for AE)

Status (WAIT, RUN, MEASURE, COMPARE, RESPOND)

State (DISABLED, Severity (NORMAL, WARNING, SEVERE, CRITICAL))

Last Value (string format)

Next Run Time ([DD Days] [HH Hours] MM:SS)

Figure 6:
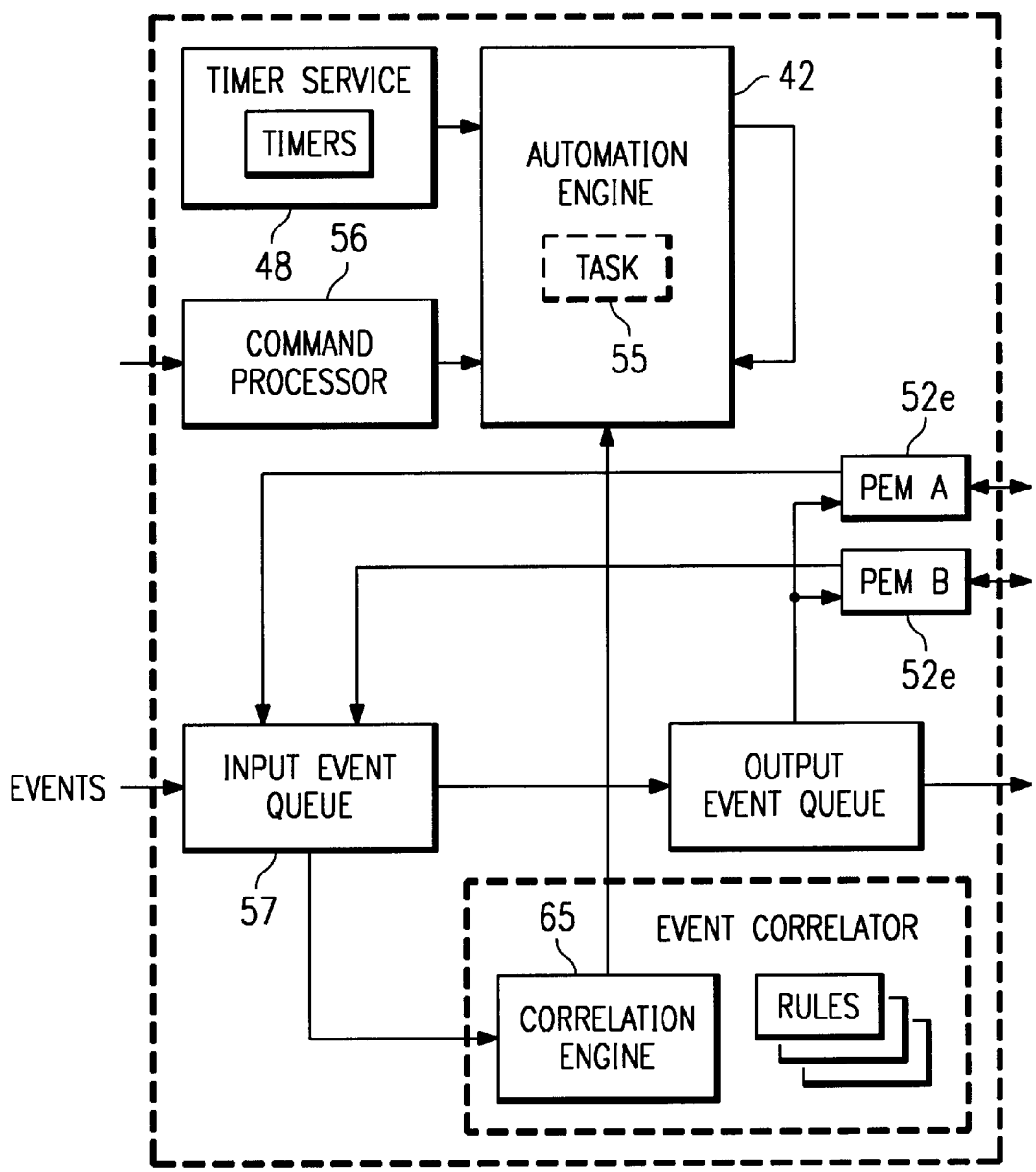
FIG. 6 is a block diagram illustrating how a particular monitoring task or agent may be triggered.

FIG. 6 is a block diagram illustrating how the distributed monitor (DM) components interact with the runtime engine 42 to execute or control a software agent 55 configured to perform monitoring. The software agent or task 55 may have been deployed from the dispatch mechanism as previously described. Inside the DM, the software agent 55 may be triggered to run via the timer service 48 or due to a control issued from another monitoring agent (e.g., one agent calling another). Outside the DM, the software agent may be triggered by an event via a PEM 52e, from input queue 57, or from a command issued from command processor 56.

Thus, a distributed monitor (DM) within a given local runtime environment uses "events" to convey status change (s) in monitored object(s). Events are correlated, as will be seen, using an event correlator comprising a correlation engine 65 and a set of correlation rules 67.

Figure 7:
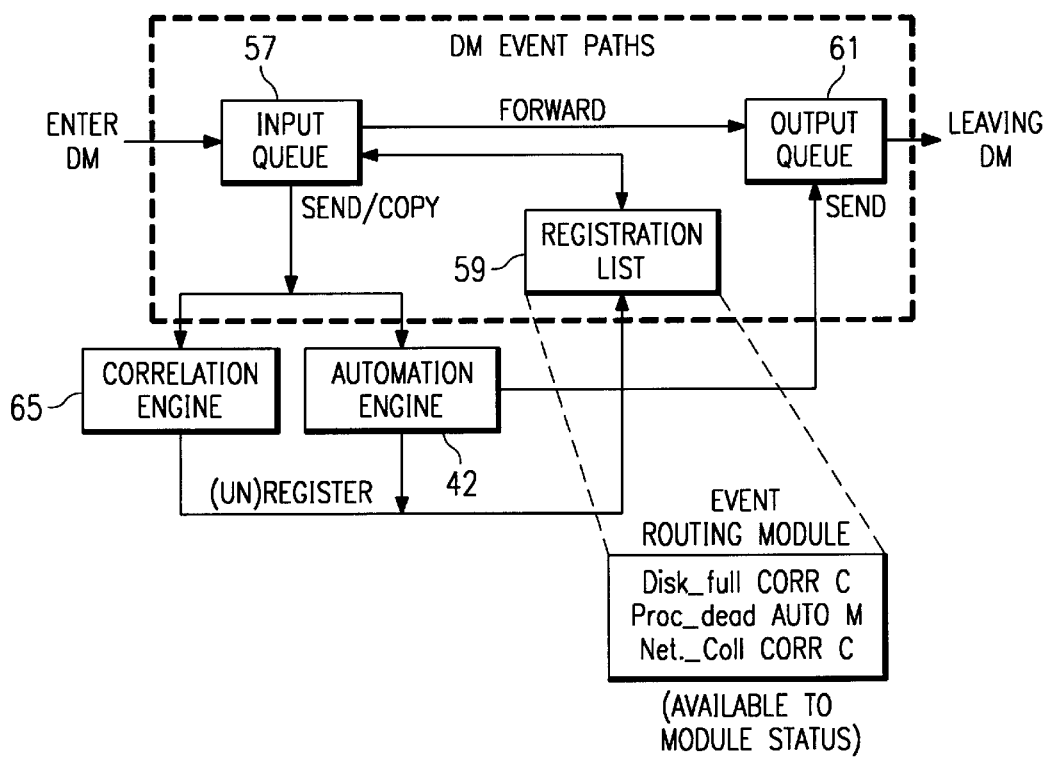
FIG. 7 is a block diagram of the event routing module of the distributed monitor.

FIG. 7 illustrates the operation of the event routing module 52b. In many cases, the event source may not be able to deliver the event directly to the destination and must send the event to an intermediate location. A given monitor may be a valid intermediate, and thus the monitor should also be able to send and receive events and to logically route them (e.g., to locations internal and external to the monitor). These functions are carried out by the event routing module.

The module includes the input queue 57, a registration list 59, and an output queue 61. When the distributed monitor receives an event, it first checks the registration list 59 for a match. If any internal module (in the DM 50) has expressed interest in the event class, the event is sent to a correlation engine 65 and (possibly) removed from the input queue 57. If the class is not in the registration list, the event is moved to the output queue 61, where it interacts with other routing data. As will be described below, each software agent can register a correlation rule for a given event which will cause the software agent to run when the event is received. The correlation rule can instruct the correlation engine 65 to consume or simply copy the event.

While processing, given software agents may generate events (as can the distributed monitor itself), and those event may be placed on the output queue 61. The output queue is processed against a routing list and, as a result, the event may be sent to a destination external to the distributed monitor (or logged/discarded). Once the event is placed in the output queue 61, it preferably cannot be routed back to an internal DM module. The output queue 61 is responsible for efficient and reliable delivery of events. Event classes tagged for reliable delivery will be queued until delivered, which includes the cases where the distributed monitor is terminated or where the destination is not available for an extended period of time. The total amount of output queuing space per distributed monitor preferably is configured on a per-DM basis. When this space is exhausted, the oldest events preferably are purged to make room for newer ones, and a DM event will be generated.

Each DM preferably receives routing data for the output-queue 61 when an software agent profile push (e.g., from the dispatch mechanism) is received. If the event topology is very dynamic, a software agent may be used to force the DM to reload its routing data at some fixed interval. When the routing data is reloaded, all queued events are reprocessed and delivery is attempted again.

Each distributed monitor thus preferably contains a table of routing information that is used to forward events up the network topology (or deliver them to the final destination). This routing table is available on-demand from an event routing service or some other source, and is stored (in memory and in a start-up file) by the DM. The elements of a routing entry are:

Event Class—A regexp tested against the events class name. A match causes this route entry to be used Destination—The name of the destination for the matched event class. For some destination types this may be empty.

Destination Type—Class of destination. Choices are: DM, EventConsole, EIF, LOG, DISCARD, MLM, IND.

Disposition—What to do with the event after the route entry has been completed, or what to do if the route destination is not available. Choices are: C, T (Continue, Terminate)

The route table for any given DM will be computed based on the event topology data which is available at the managing server and each LCF gateway. Any distributed monitor can send a request for a new route table, which will be computed based on the latest topology information available.

Referring back to FIG. 7, the input event queue 57 thus processes each event (oldest event first) against each entry in the registration list. If no registration entries match the event, it is moved to the output queue. If the event does match a registration entry it can be moved or copied into the correlation engine. A correlation match may trigger an automation to run or continue. The output event queue 61 is configured to transmit events from the DM to other locations. In particular, output queue 61 takes each event and compares its class against the class qualifier in each route entry for a match. A match is detected when the event class hashes to the same value as one of the route list entries. When a match is detected the event is marked with the queue ID. If the matched route list entry has a disposition of Continue, then the other route list entries are tested, otherwise the event is already finished.

Figure 8:
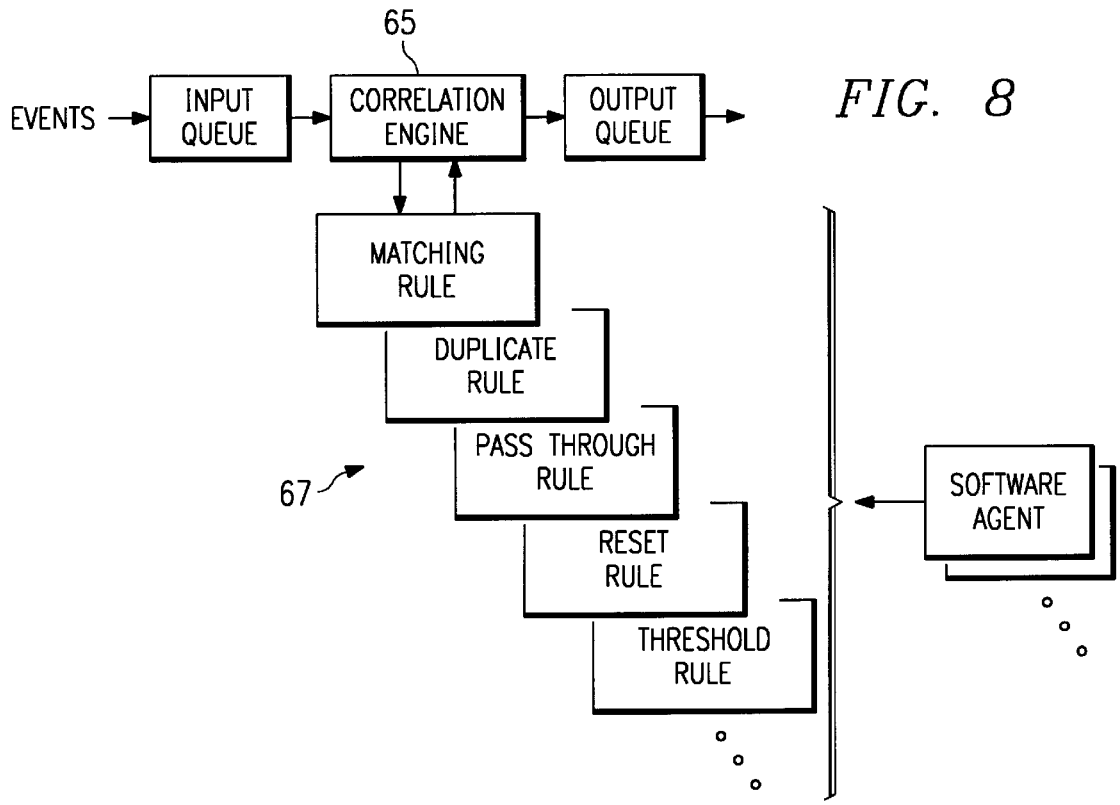
FIG. 8 is a block diagram of an event correlator of the distributed monitor of the present invention.

FIG. 8 illustrates the operation of the event correlator in more detail. As discussed above, the event correlator comprising a correlation engine 65 and a set of correlation rules 67. Correlation rules 67 are components of or adjuncts to a given software agent. They specify a context in which to analyze or to correlate system events. Preferably, the correlation rules 67 are configured at build time for the purpose of examining a certain set of events for some observable condition. Thus, a given correlation rule 67n identifies an abstract situation of which the events it addresses are symptoms. It thus relates disparate events to a more generic problem.

Each correlation rule 67 may be implemented as a simple software-based "state machine" and thus the set of correlation rules are sometimes referred to herein a set of efficiently-coupled state machines for use in correlating events. As will be seen below, because each particular state machine has a relatively simple, low level function, event correlation is much faster than is accomplished with more high level correlation methods (e.g., an inference engine). In the preferred embodiment of the present invention, there are five (5) basic types of state machines or correlation rules 67:

Matching Rules are the most simple and common rules. A matching rule is triggered by an event that matches the search criteria. A matching rule thus has a single degenerate state.

Duplicate Rules are designed to reduce the event flow traffic. Once a duplicate rule is triggered, it ignores subsequent events of the same type for a specified period of time.

PassThrough Rules are more complex matching rules that are triggered by a specific sequence of events. This sequence can be in either specific or random order.

Reset Rules are opposites of PassThrough rules. They are triggered only if the specific sequence of events does not occur; and Threshold Rules look for a specific number of the same type of event. Once this limit is reached, the rule is triggered.

Thus, a given software agent may have associated therewith a set of state machines each of which is responsive to or that recognizes a given "pattern" of one or more events. In this simplest case (namely, a matching rule), the pattern involves just a single rule. Other rules have more complex patterns associated therewith. The set of state machines define a palette of event patterns within the correlator. A given correlator may be limited with a similar set of these rules, with multiple versions of a given rule, or with just a single rule. Of course, the rule semantics described above are merely illustrative, as many other types of rules may be devised and readily implemented in a given correlator associated with a software agent. The advantage of this approach is that a relatively small set of rules can be established and then used for optimum correlation (with respect to these particular rules).

Returning now back to FIG. 8, within the context of a software agent, the correlation rules comprising the set of state machines preferably act either as "triggers" or "components". If a correlation rule is a trigger, it sits at the beginning of a chain of software agents. At runtime, the state machine defining the correlation rule is activated immediately. Then, once the correlation criteria (namely, the pattern) of the rule are met, the state machine fires an event to start the software agent running. Conversely, the state machine defining a correlation rule is an embedded component of the software agent. In this case, the state machine sits somewhere along a chain of software agents and remains deactivated until it receives the flow of control.

From an implementation perspective, a correlation rule may be implemented as a Java "Bean" wrapped around a specifically configured rule object. This rule object contains a processEvent ( ) method that does all of the real event processing work.

The correlation engine 65 preferably sits within a chain of services running within a runtime engine 42 in the local runtime environment. In addition to routing events along this service chain, its main duty is to identify events specifically addressed by correlation rules 67 and to forward them accordingly. In order to keep track of currently active correlation rules, the correlation engine 65 uses the registration list 59 (of FIG. 7) to group rules according to the types of events they address. As noted above, a correlation rule is preferably a Java Bean wrapped around a rule object; registration simply means the correlation rule passes a reference of its rule object to the correlation engine, which groups it according to event type.

The correlation engine further categorizes its registered rules as either active or in-active. This distinction is important when considering the role a correlation rule plays within or in association with a software agent. If a correlation rule acts as a trigger within the software agent, the rule activates itself at registration time and starts processing events immediately. If a correlation rule is an embedded component of a software agent, it remains de-activated at registration time. Then, only when control flows to the rule does it activate itself. In both cases, the correlation rule remains active long enough for either its correlation criteria to be met or a specified time to occur.

The correlation engine is always routing events, even if there are no correlation rules present, along the service chain. Thus, the correlation engine 65 is a constantly running service that collects events from the input queue 57 into its own internal queue (not shown). A separate thread continuously grabs an event from this queue, if available, and processes it within a given context. In the absence of any correlation rules (the simplest case), this "event processing" merely entails forwarding the event to the output queue 61. Thus, in this context, the correlation engine acts as a simple event router.

When a software agent containing a correlation rule is loaded into the local runtime environment, the correlation rule registers itself with the correlation engine and, depending on its role within the software agent, immediately identifies itself as either active or de-active. As the correlation engine processes events, it checks whether the current event is addressed by any registered, active correlation rules. If there is a match, the correlation engine sends the event to the rule processEvent ( ) method.

The many ways the correlation engine can route an event are now described. In most cases, the flow of events along the service chain will remain unmodified. If there are active correlation rules present, they receive copies of appropriate events, which are also forwarded to the output queue 61. The resultant sequence of events is the same as the initial sequence.

There are two cases, however, which may modify the event stream. First, a correlation rule may, "steal" an event from the stream. In this case, when the correlation engine sends an event to one or more of its registered rules, that event is lost to the service chain event stream. A correlation rule has a "consume" attribute that determines this behavior. If the attribute is set, then the rule consumes the event; if not, then the correlation rule receives a copy of the event (which is also forwarded to the output queue 61). In the second case, a software agent can re-insert an event into the event stream. There are several scenarios in which an agent can return an internally modified event to the input queue 57 but such an operation is not without risk. In particular, if the re-inserted event is again processed by the correlation engine, there is a possibility that the software agent will be caught in an event processing loop. To avoid such a situation, events can be flagged as "modified" when they are returned to the input queue. When such a flagged event is again examined by the correlation engine, it will pass the event to the output queue without sending it to a correlation rule. Once the event has left the correlation engine, its "modified" flag is cleared.

Once a correlation rule is finished processing events, e.g., either its criteria have been met or a specified timeout has occurred, it immediately de-activates itself. In the event that the correlation criteria have been satisfied, the correlation rule has the option of forwarding one, some, or all of the correlated events to whomever is listening. In most cases, this will be another agent component which aggregates the resultant correlation events into some useful format and forwards it to whomever is listening to the agent as a whole. In certain cases, however, such an agent component can take the events received from the correlation rule (which are themselves events plucked out of the service chain event stream), modify them in some way, and re-insert them in the input queue. In these cases, the re-inserted events must be marked as modified before they are returned to the event stream in order to avoid an event processing loop.

It should be appreciated that the present invention is not limited to monitoring any particular type of resource in the distributed computer network. In a network of computing machinery, a variety of systems, devices and/or components at different levels of conceptual complexity may be considered "resources". Thus, for example, some resources are actual hardware components of the network or the computing machinery, such as network routers or disk drives. Some resources are properties of the operating systems running on computers in the network, such as the set of active applications or open files. Still other resources are applications running on computers in the network. Finally, some aggregations of these types of resources may be considered high-level resources for management purposes. Examples of such high-level resources are: database management systems that include one or more server processes, client processes and their connections to the server, file systems (disk drives), and operating system resources, or distributed computation systems that include server applications on various computers, interconnections, file and memory resources, and communication subsystems.

Such distributed computing resources, in order to be used as critical components for the operation of an organization, must be continually monitored. The present invention thus illustrates how mobile software components (preferably Java-based) are deployed in the network and locally executed, preferably using a Java-based runtime environment, to perform a given monitoring task with respect to any such resource(s). The use of Java-based agents and runtime engines ensures that the components are easily portable across disparate system machines even as the network grows to include many thousands of connected, managed computers.

One of the preferred implementations of the runtime monitor is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

The present invention provides numerous advantages over the prior art. The technique is readily scaleable as the distributed network increases in size. An administrator is able to add new monitoring capabilities to an appropriate subset of the endpoints with minimal effort. The distributed monitoring application behaves predictably under peak conditions, and individual monitors may be readily adjustable to consume a minimum portion of the available computing resources (network, CPU, disk).

The invention also provides more built-in local response capability. It is insufficient to note that a monitored value is out of tolerance. Whenever possible, a local attempt to correct the situation must be made. Some errors have no local remedy, such as a client application which is dependent on a single server. In these cases, the response must have a corresponding remote action which can be triggered by the client error. The invention also provides more efficient monitor execution, even though the monitor is executing on systems which have less capacity than previous endpoints. The distributed monitor is written as efficient as possible in terms of CPU and memory requirements. Further, the monitor is easy to integrate with other event systems. The distributed monitor thus provides a good bridge between system management and network management, allowing network-specific events to be used in application problem diagnosis.

Having thus described our invention, what we claim as new and desire to secure by letters patent is set forth in the following claims.

What is claimed is:

1. A method of monitoring in a distributed computer network having a set of managed computers, wherein instances of a runtime engine are deployed across a given subset of the managed computers, the method comprising the steps of:

at a given managed computer, establishing an event class registration list;

upon receipt of an event having an event class associated therewith, examining the registration list to determine whether a given monitoring task has expressed interest in the event class;

processing the event through a correlator if the monitoring task has expressed interest in the event class; and taking a given action if a condition expressed in a correlation rule associated with the monitoring task has been met.

2. The method as described in claim 1 wherein the given action initiates the given monitoring task.

3. The method as described in claim 2 wherein the given monitoring task is executed in the runtime engine to determine whether a given threshold has been exceeded.

4. The method as described in claim 3 wherein the monitoring task takes a measurement and compares the measurement against the given threshold.

5. The method as described in claim 4 further including the step of having the monitoring task attempt to correct a detected condition when the given threshold has been exceeded.

6. The method as described in claim 1 wherein the step of processing the event further includes consuming the event.

7. The method as described in claim 1 wherein the step of processing the event includes delivering the event to an output queue for subsequent delivery to a target location.

8. An apparatus for monitoring in a distributed computer network having a set of managed computers, wherein instances of a runtime engine are deployed across a given subset of the managed computers, comprising:

list means, at a given managed computer, for establishing an event class registration list;

examination means, upon receipt of an event having an event class associated therewith, for examining the registration list to determine whether a given monitoring task has expressed interest in the event class;

processing means for processing the event through a correlator if the monitoring task has expressed interest in the event class; and means for taking a given action if a condition expressed in a correlation rule associated with the monitoring task has been met.

9. The apparatus as described in claim 8 wherein the given action initiates the given monitoring task.

10. The apparatus as described in claim 9 wherein the given monitoring task is executed in the runtime engine to determine whether a given threshold has been exceeded.

11. The apparatus as described in claim 10 wherein the monitoring task takes a measurement and compares the measurement against the given threshold.

12. The apparatus as described in claim 11 wherein the monitoring task attempts to correct a detected condition when the given threshold has been exceeded.

13. The apparatus as described in claim 8 wherein the processing mean further includes means for consuming the event.

14. The apparatus as described in claim 8 wherein the processing means includes means for delivering the event to an output queue for subsequent delivery to a target location.

15. A method of monitoring a resource in a distributed computer network having a management server servicing a set of managed computers, comprising the steps of:

deploying instances of a runtime engine across a subset of the managed computers;

deploying a software agent into the computer network;

at a given managed computer, upon receipt of an event that satisfies a condition established by a correlation rule associated with the software agent, executing the software agent using the runtime engine to determine whether a given threshold has been exceeded; and taking a given action if the given threshold has been exceeded.

16. The method as described in claim 15 wherein the step of executing the software agent includes taking a measurement and comparing the measurement against the given threshold.

17. The method as described in claim 15 wherein the given action comprises attempting to correct a detected condition when the given threshold has been exceeded.

18. The method as described in claim 15 wherein the given action comprises outputting an event when the given threshold has been exceeded.

19. The method as described in claim 15 wherein the runtime engine includes a Java virtual machine and the software agent is a Java applet.

20. A computer program product, in a computer readable medium, for monitoring a resource in a distributed computer network having a management server servicing a set of managed computers, comprising:

instructions for deploying instances of a runtime engine across a subset of the managed computers;

instructions for deploying a software agent into the computer network;

instructions, at a given managed computer, upon receipt of an event that satisfies a condition established by a correlation rule associated with the software agent, for executing the software agent using the runtime engine to determine whether a given threshold has been exceeded; and instructions for taking a given action if the given threshold has been exceeded.

21. A computer program product, in a computer readable medium, for monitoring in a distributed computer network having a set of managed computers, wherein instances of a runtime engine are deployed across a given subset of the managed computers, comprising:

instructions, at a given managed computer, for establishing an event class registration list;

instructions, upon receipt of an event having an event class associated therewith, for examining the registration list to determine whether a given monitoring task has expressed interest in the event class;

instructions for processing the event through a correlator if the monitoring task has expressed interest in the event class; and instructions for taking a given action if a condition expressed in a correlation rule associated with the monitoring task has been met.

22. An apparatus for monitoring a resource in a distributed computer network having a management server servicing a set of managed computers, comprising:

first deployment means for deploying instances of a runtime engine across a subset of the managed computers;

second deployment means for deploying a software agent into the computer network;

execution means, at a given managed computer, upon receipt of an event that satisfies a condition established by a correlation rule associated with the software agent, for executing the software agent using the runtime engine to determine whether a given threshold has been exceeded; and means for taking a given action if the given threshold has been exceeded.

23. The apparatus as described in claim 22 wherein the execution means includes means for taking a measurement and comparing the measurement against the given threshold.

24. The apparatus as described in claim 22 wherein the given action comprises attempting to correct a detected condition when the given threshold has been exceeded.

25. The apparatus as described in claim 22 wherein the given action comprises outputting an even when the given threshold has been exceeded.

26. The apparatus as described in claim 22 wherein the runtime engine includes a Java virtual machine and the software agent is a Java applet.

* * * * *